United States Patent
Song

(10) Patent No.: US 12,502,348 B2
(45) Date of Patent: Dec. 23, 2025

(54) ULTRAVIOLET BLOCKING COSMETIC COMPOSITION IN CHROMATIC EMULSION STATE

(71) Applicant: LG Household & Health Care Ltd., Seoul (KR)

(72) Inventor: Seung Jin Song, Seoul (KR)

(73) Assignee: LG Household & Health Care Ltd., Seoul (KR)

(*) Notice: Subject to any disclaimer, the term of this patent is extended or adjusted under 35 U.S.C. 154(b) by 805 days.

(21) Appl. No.: 17/636,658

(22) PCT Filed: Aug. 20, 2020

(86) PCT No.: PCT/KR2020/011100
§ 371 (c)(1),
(2) Date: Feb. 18, 2022

(87) PCT Pub. No.: WO2021/034121
PCT Pub. Date: Feb. 25, 2021

(65) Prior Publication Data
US 2022/0287951 A1    Sep. 15, 2022

(30) Foreign Application Priority Data
Aug. 20, 2019 (KR) .......... 10-2019-0101464

(51) Int. Cl.
*A61K 8/894* (2006.01)
*A61K 8/06* (2006.01)
*A61Q 17/04* (2006.01)

(52) U.S. Cl.
CPC .............. *A61K 8/894* (2013.01); *A61K 8/064* (2013.01); *A61Q 17/04* (2013.01)

(58) Field of Classification Search
CPC .... A61K 8/894; A61K 8/064; A61K 2800/26; A61K 2800/596; A61K 8/06; A61K 8/368; A61K 8/37; A61K 8/84; A61K 2800/438; A61K 8/345; A61K 8/415; A61K 8/4966; A61K 8/86; A61K 2800/262; A61Q 17/04

See application file for complete search history.

(56) References Cited

U.S. PATENT DOCUMENTS

| | | |
|---|---|---|
| 2015/0050321 A1 | 2/2015 | Gately et al. |
| 2015/0216766 A1 | 8/2015 | Tanaka et al. |
| 2017/0165187 A1* | 6/2017 | Kennedy .............. A61K 8/8182 |
| 2020/0113798 A1 | 4/2020 | Kim |

FOREIGN PATENT DOCUMENTS

| | | |
|---|---|---|
| CN | 101312706 A | 11/2008 |
| CN | 109820738 A | 5/2019 |
| EP | 3470053 A1 | 4/2019 |
| JP | 2012211114 A | 11/2012 |
| JP | 2013184944 A | 9/2013 |
| JP | 2016523983 A | 8/2016 |
| JP | 2018009020 A | 1/2018 |
| KR | 20130056700 A | 5/2013 |
| KR | 20170002105 A | 1/2017 |
| KR | 20170140721 A | 12/2017 |
| KR | 20190038028 A | 4/2019 |
| KR | 20190062947 A | 6/2019 |
| TW | 201043255 A | 12/2010 |
| WO | 2019004596 A1 | 1/2019 |

OTHER PUBLICATIONS

KR20190062947A Machine Translation (Year: 2019).*
WO2019004596A1 Machine Translation (Year: 2019).*
International Search Report for PCTKR2020011100 dated Nov. 27, 2020, 2 pgs.
Van Reeth, I et al., "A Hydrophilic Silicone Elastomer for Broader Formulating Flexibility", "Cosmetics and Toiletries", Jun. 2013, pp. 802-806, vol. 127, No. 11.
Hongtian, F. et al., "society Cosmetic production safety knowledge," Yangcheng Evening News, Jun. 2018, p. 52.
Search Report dated Jan. 8, 2024 from the Office Action for Chinese Application No. 202080057306.4 issued Jan. 9, 2024, 3 pages.

* cited by examiner

*Primary Examiner* — Robert A Wax
*Assistant Examiner* — Quanglong N Truong
(74) *Attorney, Agent, or Firm* — Lerner David LLP

(57) ABSTRACT

The present invention relates to an ultraviolet blocking cosmetic composition in a chromatic emulsion state, containing a high quantity of an organic ultraviolet-blocking agent, and a silicone-based surfactant in which polyethylene glycol-added dimethicone and polypropylene glycol are cross-linked, and the cosmetic composition according to the present invention can exhibit a stable chromatic emulsion state even if containing a high quantity of the organic ultraviolet-blocking agent.

12 Claims, 1 Drawing Sheet

[FIG. 1]
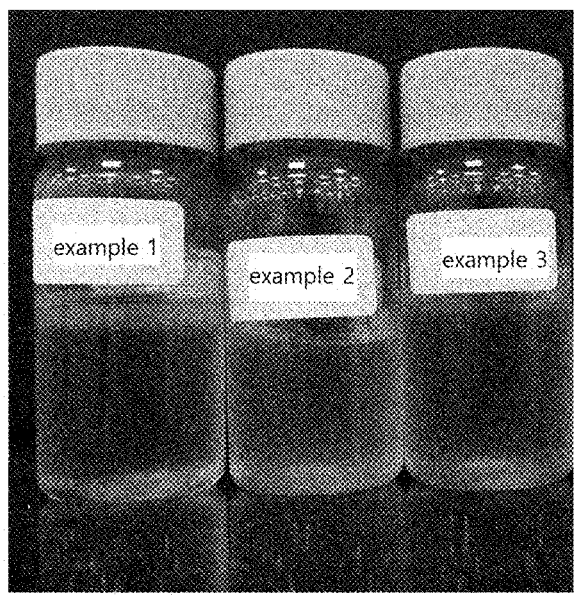
[FIG. 2]
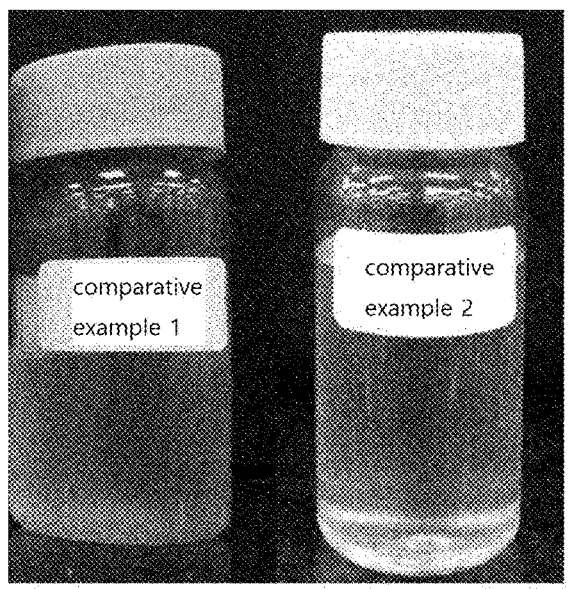

ULTRAVIOLET BLOCKING COSMETIC COMPOSITION IN CHROMATIC EMULSION STATE

CROSS-REFERENCE TO RELATED APPLICATIONS

The present application is a national phase entry under 35 U.S.C. § 371 of International Application No. PCT/KR2020/011100 filed Aug. 20, 2020, which claims priority from Korean Application No. 10-2019-0101464 filed Aug. 20, 2019, all the disclosures of which are incorporated herein by reference.

TECHNICAL FIELD

The present invention relates to an ultraviolet-blocking cosmetic composition in the form of a stable chromatic emulsion in which a structural color is expressed.

BACKGROUND ART

Ultraviolet rays irradiated from sunlight are a major cause of erythema, edema, freckles, or skin cancer on the skin, and accordingly, many studies on various skin diseases caused by ultraviolet rays have been actively conducted in recent years.

In general, ultraviolet rays are divided into UV-A, UV-B, and UV-C according to their wavelength. A wavelength of 320 to 400 nm is classified as UV-A, a wavelength of 280 to 320 nm is classified as UV-B, and a wavelength of 200 to 280 nm is classified as UV-C. UV-A penetrates into the dermis of the skin and causes skin cancer, and is known to cause skin aging and skin irritation by promoting the formation of wrinkles and melanin, and UV-B is known to penetrate into the epidermis of the skin and cause erythema, freckles or edema. As UV-C passes through the ozone layer, it does not reach the earth's surface and is lost.

In order to prevent or improve skin diseases related to exposure to sunlight as described above, consumer interest in UV protection products is increasing. As a result, UV protection products having various types of UV protection factor (SPF) have been released. In general, UV protection products include inorganic ultraviolet-blocking agents such as titanium dioxide or zinc oxide, or organic ultraviolet blocking agents such as ethylhexylmethoxycinnamate, ethylhexylsalicylate, octocrylene, ethylhexyltriazone, bis-ethylhexyloxyphenol methoxyphenyltriazine or ethylaminohydroxybenzoylhexylbenzoate to exhibit high SPF values.

However, most of the organic ultraviolet-blocking agents used in UV protection products are oil-soluble ingredients with a high refractive index, and inorganic ultraviolet-blocking agents are opaque powder ingredients, so general UV protection products (sunscreens) show an opaque emulsion appearance.

Meanwhile, "chromatic emulsion" refers to an emulsion that expresses a structural color due to the difference in the light dispersing ability between the aqueous and oil phases while being transparent by matching the refractive indices of the aqueous phase and the oil phase of the composition (J. Am. Chem. Soc., Chromatic Emulsion, 1922, 44(1), pp 71-74). Conventionally, a number of cosmetic studies using a chromatic emulsion have been attempted, but an innovative breakthrough for producing a cosmetic composition for ultraviolet protection having a stable chromatic emulsion property capable of blocking everyday ultraviolet rays has not been developed to date.

DISCLOSURE

Technical Problem

The present inventors have studied to develop an ultraviolet-blocking cosmetic composition in the form of a stable chromatic emulsion that is transparent and expresses a structural color compared to a conventional ultraviolet-blocking cosmetic composition having an opaque appearance. As a result, when adding, to the cosmetic composition, a silicone-based surfactant excluding a specific component in specific content together with organic ultraviolet-blocking agent, it was confirmed that formulation stability was excellent while exhibiting a chromatic emulsion state, and the present invention was completed.

Therefore, an object of the present invention is to provide a cosmetic composition which does not exhibit cloudiness, is stable, and exhibits a chromatic emulsion state in which structural color is expressed, the cosmetic composition including an organic ultraviolet-blocking agent and a silicone-based surfactant excluding a PEG-15/lauryldimethicone crosspolymer in the range of specific content.

Technical Solution

As a means for solving the above problems, an object of the present invention is to provide an ultraviolet-blocking cosmetic composition including an organic ultraviolet-blocking agent; and a silicone-based surfactant.

In addition, the present invention provides a method for preparing an ultraviolet-blocking cosmetic composition, including the step of mixing an organic ultraviolet-blocking agent and a silicone-based surfactant.

Hereinafter, the configuration of the present invention will be described in detail.

The present invention provides an ultraviolet-blocking cosmetic composition including an oil phase including 10 to 40 parts by weight of an organic ultraviolet-blocking agent and 1 to 10 parts by weight of a silicone-based surfactant in which polyethylene glycol-added dimethicone and polypropylene glycol are cross-linked, based on the weight of the total composition; and an aqueous phase.

In the present invention, the organic ultraviolet-blocking agent may be selected from the group consisting of ethylhexyl methoxycinnamate, isoamyl P-methoxycinnamate, ethylhexyl salicylate, octocrylene, polysilicon-15, homosalate, phenylbenzimidazole sulfonic acid, bis-ethylhexyloxyphenol methoxyphenyltriazine, butylmethoxydibenzoylmethane, diethylaminohydroxybenzoylhexylbenzoate, ethylhexyltriazone, 4-methylbenzylidene camphor, benzophenone-3, diethylhexylbutamidotriazone and disodiumphenyldibenzimidazoltetrasulfonate, but is not limited thereto. As the organic ultraviolet-blocking agent, all organic materials that have been conventionally used for blocking ultraviolet rays may be applied without limitation.

In the present invention, when the organic ultraviolet-blocking agent is included in an amount of 10 to 40 pans by weight based on the total weight of the cosmetic composition, it is possible to provide an excellent ultraviolet-blocking effect and a feeling of use. When the composition contains less than 10 parts by weight of the organic ultraviolet-blocking agent, a sufficient ultraviolet-blocking effect cannot be exhibited, and when it exceeds 40 parts by weight, problems such as skin irritation or an oily feeling may occur. For example, the organic ultraviolet-blocking agent may be included in an amount of 10 to 35 parts by weight, 10 to 30 pans by weight, 10 to 25 parts by weight, 10 to 20 parts by weight, 15 parts by weight to 35 parts by weight, 15 parts by weight to 30 parts by weight, 15 to 25 parts by weight, 15 to 20 parts by weight, 20 to 35 parts by weight, 20 to 30 parts by weight, 25 to 35 parts by weight, and 25 to 30 parts by weight, based on the total weight of the composition.

In the present invention, the silicone-based surfactant is characterized in that PEG-15/lauryl dimethicone crosspolymer is excluded, and may be a silicone-based surfactant to which 1 to 30 moles of polyethylene glycol (PEG)-added dimethicone and 1 to 30 moles of polypropylene glycol (PPG) are cross-linked.

In one embodiment, the silicone-based surfactant may be PEG-12 dimethicone/PPG-20 crosspolymer, but is not limited thereto.

In the following examples, it was confirmed that the cosmetic composition (Comparative Example 2) using PEG-15/lauryldimethicone crosspolymer as a silicone-based surfactant had poor formulation stability such as phase separation under high temperature conditions (50° C.).

In the present invention, the silicone-based surfactant may be included in an amount of 1 to 10 parts by weight, such as 1 to 8 parts by weight, 1 to 6.5 parts by weight, 1 to 5 parts by weight, 3 to 10 parts by weight, 3 to 8 parts by weight, 3 to 5 parts by weight, 4 to 10 parts by weight, 4 to 8 parts by weight, 4 to 6.5 parts by weight, 4.5 to 6.3 parts by weight, based on the part by weight of the total composition. In the present invention, when the content of the silicone-based surfactant is out of the above range, it may affect the refractive index of the oil phase, thereby causing a problem in the transparency of the formulation.

In the present invention, the cosmetic composition may further include a non-ionic surfactant. The non-ionic surfactant may be one selected from the group consisting of polyether-modified silicone, polyglycerin-modified silicone, glyceryl fatty acid esters, polyglyceryl fatty acid esters, polyether fatty acid esters, sorbitan fatty acid esters, and sugar fatty acid esters. More specifically, non-ionic surfactant may be lauryl PEG-9 polydimethylsiloxyethyl dimethicone, polyglyceryl-6 polyricinoleate, sorbitan sesquioleate, sorbitan isostearate, PEG-9 polydimethylsiloxyethyl dimethicone. PEG-10 dimethicone, or cetyl PEG/PPG-10/1 dimethicone, but is not limited thereto.

In one embodiment, the non-ionic surfactant may be a polyether-modified silicone, such as laurylPEG-9 polydimethylsiloxyethyldimethicone.

In the present invention, when the ultraviolet-blocking cosmetic composition includes a silicone-based surfactant in which polyethylene glycol-added dimethicone and polypropylene glycol are cross-linked and the non-ionic surfactant, the combined use of the silicone-based surfactant and the non-ionic surfactant may express a structural color while exhibiting excellent compatibility and a transparent formulation.

In the present invention, the non-ionic surfactant may be included in an amount of 0.1 to 10 parts by weight, such as 0.5 to 5 parts by weight, 1 to 3 parts by weight, 0.1 to 5 parts by weight, or 0.1 to 3 parts by weight, based on the part by weight of the total composition.

The composition according to the present invention includes an oil phase including the organic ultraviolet-blocking agent and a silicone-based surfactant. In the present invention, the oil phase may further include a non-ionic surfactant, oil or wax. All of the oils and waxes commonly used as components of cosmetics in the art may be applied. For example, the oil may be a silicone-based oil, ester-based oil, triglyceride-based oil, hydrocarbon-based oil, or vegetable oil, and one or more of these components may be combined as needed.

For example, the silicone-based oil may be a silicone-based fluid oil or a silicone-based crosspolymer dispersed in oil. For example, as silicone-based flowable oils, cyclopentasiloxane, cyclohexasiloxane, cycloheptasiloxane, cyclomethicone, cyclophenyl methicone, cyclotetrasiloxane, cyclotrisiloxane, dimethicone, caprylyl dimethicone, caprylyl trimethicone, caprylyl methicone, cetearyl methicone, hexadecyl methicone, hexyl methicone, lauryl methicone, myristyl methicone, phenyl methicone, stearyl methicone, stearyl dimethicone, trifluoropropyl methicone, cetyl dimethicone, diphenyl siloxyphenyl trimethicone, dimethylpolysiloxane, methylphenyl polysiloxane, decamethylcyclopentasiloxane, methyl trimethicone or phenyl trimethicone may be used. The silicone-based oil components may be used alone or in combination of two or more types of oils.

As ester-based oils, dicaprylyl carbonate, ascorbyl palmitate, ascorbilinolate, ascorbyl stearate, diisostearyl malate, benzyl benzoate, benzyl laurate, butylene glycol dicaprylate/dicaprate, butylene glycol diisononanoate, butylene glycol laurate, butylene glycol stearate, butyl isostearate, cetearyl isononanoate, cetearyl nonanoate, cetyl caprylate, cetylethylhexanoate, cetyl isononanoate, ethylhexyl caprylate/caprate, ethylhexyl isononanoate, ethylhexyl isostearate, ethylhexyllaurate, hexyllaurate, octyldodecyl Sostearate, isopropyl isostearate, isostearyl isononanoate, isostearyl isostearate, isocetylethylhexanoate, neopentyl glycol dicaprate, neopentyl glycol diethyl hexanoate, neopentyl glycol diisononanoate, neopentyl glycol diisostearate, pentaerythrityl stearate, pentaerythrityl tetraethylhexanoate, dipentaerythrityl hexaacid ester, polyglyceryl-2-disstearate, polyglyceryl-2-sesquiisostearate, polyglyceryl-2-isostearate, polyglyceryl-2-tetraisostearate, polyglyceryl-2-triisostearate, polyglyceryl-3-diisostearate, polyglyceryl-3-isostearate, polyglyceryl-4-disostearate, polyglyceryl-4-isostearate, polyglyceryl-6-disostearate, polyglyceryl-6-sesquiaisostearate or triethylhexanoin may be used.

As triglyceride-based oils, a C8-C12 acid triglyceride, a C12-C18 acid triglyceride, caprylic/capric/triglyceride, caprylic/capric/lauric triglyceride, a C10-C40 isoalkyl acid triglyceride, a C10-C18 triglyceride, glyceryl triacetylhydrostearate, soybean glyceride, tribehenin, tricaprine, triethylhexanoin, triheptanoin, triisostearin, tripalmitin or tristearin may be used.

As the hydrocarbon-based oils, paraffin oil (liquid paraffin, mineral oil), paraffin, Vaseline, microcrystalline wax, or squalene may be used.

As vegetable oils, avocado oil, wheat germ oil, rosehip oil, shea butter, almond oil, olive oil, macadamia oil, argan oil, meadowfoam oil, sunflower oil, castor oil, camellia oil, corn oil, safflower oil, soybean oil, rapeseed oil, macadamia nut oil, jojoba oil, palm oil, palm kernel oil or coconut oil may be used.

As the wax, all waxes such as hydrocarbon waxes, vegetable waxes, or silicone waxes generally used in cosmetics may be used. For example, candelilla wax, carnauba wax, rice wax, bees wax, lanolin, ozokerite, ceresin wax, paraffin wax, microcrystalline wax, C30-C45 alkyl dimethylsilyl polypropyl silsesquioxane, ethylene/propylene copolymer or polyethylene wax may be included, but is not limited thereto.

The content of the oil phase is not particularly limited, and its content may be adjusted to control the difference in refractive index from the aqueous phase.

In one embodiment, 10 to 55 parts by weight, such as 15 to 50 parts by weight, 20 to 45 parts by weight, 25 to 40 parts by weight, or 29 to 36 parts by weight of the content of the oil or wax may be included, based on the total weight of the composition. In the present invention, when the composition contains oil in the above range, it is possible to reduce the content of polyols which induce stickiness, thereby providing a cosmetic composition having an excellent feeling of use.

In addition, in the composition of the present invention, the aqueous phase means including water, and the aqueous phase may further include a polyol. The polyol may be selected from the group consisting of glycerin, 1,3-butylene glycol, dipropylene glycol and propylene glycol, but may be used without limitation as long as it is a component used to increase the refractive index of the aqueous phase.

In general, since the aqueous phase has a lower refractive index than the oil phase, it is not easy to reduce the difference in refractive index between the oil phase and the aqueous phase. The cosmetic composition according to the present invention may have a difference in refractive index between the oil phase and the aqueous phase of 0.009 or less. The cosmetic composition of the present invention may exhibit a chromatic emulsion state in which a structural color is expressed while being transparent by having a low difference in refractive index as described above. When the difference in refractive index between the oil phase and the aqueous phase exceeds 0.009, formulation stability may be deteriorated.

In one embodiment, the difference in refractive index between the oil phase and the aqueous phase may be less than 0.005.

In the present invention, the "chromatic emulsion" state means a state that expresses a structural color according to the viewing angle and the light source without using pigments and dyes as colorants, and "structural color" means the color that appears as the particles disperse, refract and interfere with the light like a prism.

The cosmetic composition of the present invention may further include all kinds of additives usable in conventional cosmetics. The additives may include both natural additives or synthetic additives.

The natural additives refer to ingredients such as organic raw materials, plants and plant-derived raw materials, animals and animal-derived raw materials, minerals and mineral-derived raw materials, and water. For example, it may be one or more additives selected from the group consisting of a moisturizer, a sunscreen, a neutralizer, a fragrance, a preservative, an antioxidant, a thickener, a viscosity modifier, a film former, and a colorant.

The natural additive may be included in an amount of 0.01 to 3 parts by weight, such as 0.05 to 2 parts by weight, and 0.1 to 1 parts by weight, based on 100 parts by weight of the total composition.

In the present invention, the natural additive means to simply modify a natural product or a component obtained from natural products or natural products, or to include a component synthesized from natural components, and to exclude synthetic components synthesized by an artificial method that are not naturally derived components.

The natural raw materials may refer to, for example, organic standards and eco-friendly certification grades determined by the country, or cosmetic raw materials of a natural origin grade that can be equivalent thereto.

The "eco-friendly certification criteria" certify a composition composed of ingredients grown and processed in an eco-friendly manner that excludes synthesis processes, and typical eco-friendly certifications include the ECOCERT of France, COSMOS of Europe, the US Department of Agriculture (USDA) of the U.S., the Association of German Industries and Trading Firms (BDIH) of Germany, the Japanese Association of Standard (JAS) of Japan, and in response to the recent consumer preference for eco-friendly products, each country has developed various eco-friendly certification systems to certify the safety of ingredients or products. Although details such as numerical values and ranges may be slightly different by country, categories of primary components, such as raw materials and ingredients, for which the eco-friendly certifications are granted are globally the same in a broad sense. Naturally derived ingredients belong to the eco-friendly organic ingredient category, and other semi-processed ingredients are classified into Physically Processed Agro Ingredients (PPAIs) and Chemically Processed Agro Ingredients (CPAIs), and only raw materials that meet these standards are certified by the ECOCERT, COSMOS, USDA, or the like.

In the present invention, raw materials and ingredients certified by the country as being organic and eco-friendly refer to cosmetic raw materials and compositions which are formed only of components satisfying or possibly satisfying organic standards and eco-friendly certification standards set by the country and thus are capable of satisfying the organic and eco-friendly standards set by the country. For example, the raw materials and ingredients certified by the country as being organic and eco-friendly refer to those formed only of components satisfying or possibly satisfying the standards set by the Chinese government or the organic and eco-friendly certification standards recognized in China.

In the present invention, the synthetic additive refers to a raw material that has been chemically synthesized rather than derived from nature.

Each of the above components included in the cosmetic composition according to the present invention may be preferably included in the cosmetic composition of the present invention within a range not exceeding the maximum amount stipulated in the "Cosmetics Safety and Technical Specifications" prescribed by the Chinese government.

The cosmetic composition according to the present invention may be prepared in any formulation conventionally prepared in the art. For example, the cosmetic composition may include a lotion such as a softening lotion or a nourishing lotion, a spray-type lotion, a facial lotion, an emulsion such as a body lotion, a cream such as a nourishing cream, a moisturizing cream, an eye cream, a stick, an essence, a cosmetic ointment, a spray, a gel, a pack, a sunscreen, a makeup base, a foundation such as a liquid or spray type, powder, a cleansing lotion, a makeup remover such as cleansing oil, a cleansing agent such as cleansing foam, soap, body wash, etc., but is not limited thereto.

In one embodiment, the formulation of the cosmetic composition may be a water-in-oil (W/O) formulation.

In one embodiment, the cosmetic composition may be transparent or semi-transparent.

The cosmetic composition of the present invention can be used according to a conventional method of use, and the number of times of use can be varied according to the skin condition or taste of the user.

The present invention may also relate to the use of a cosmetic composition for the manufacture of cosmetics. The above-mentioned description of the cosmetics can be applied mutatis mutandis to the cosmetic composition for the manufacture of cosmetics of the present invention.

The cosmetics may be general cosmetics, natural cosmetics, hypoallergenic cosmetics, or organic agricultural cosmetics.

In addition, the preparation method of the cosmetic composition of the present invention includes a step of preparing an oil phase by mixing an organic ultraviolet blocking agent; and a silicone-based surfactant in which polyethylene glycol-added dimethicone and polypropylene glycol are cross-linked.

In the preparation method, the amount of the organic ultraviolet-blocking agent may be 10 to 40 parts by weight, and the amount of the silicone-based surfactant in which polyethylene glycol-added dimethicone and polypropylene glycol are cross-linked may be less than 10 parts by weight, based on 100 parts by weight of the total composition.

In addition, the preparing method may further include a step of emulsifying by adding an aqueous phase to the oil phase.

In addition, the preparing method may further include a step of adding a non-ionic surfactant to the oil phase.

For the organic ultraviolet blocking agent, the silicone-based surfactant in which polyethylene glycol-added dimethicone and polypropylene glycol are cross-linked, and the cosmetic composition, the above-mentioned description of the cosmetics can be applied mutatis mutandis.

Advantages and features of the present invention, and a method for achieving them will become apparent with reference to the experimental examples and preparation examples described below in detail. However, the present invention is not limited to the Experimental Examples and Preparation Examples disclosed below, but may be embodied in various different forms, and is provided merely for the complete disclosure of the invention, and for the purpose of fully informing the scope of the invention to one skilled in the art to which the invention pertains.

Advantageous Effects

The present invention relates to an ultraviolet-blocking cosmetic composition in a chromatic emulsion state, including a high quantity of organic ultraviolet-blocking agent and a silicone-based surfactant in which polyethylene glycol-added dimethicone and polypropylene glycol are cross-linked, wherein the cosmetic composition can exhibit a stable chromatic emulsion state even when it contains a high quantity of organic ultraviolet-blocking agent.

DESCRIPTION OF DRAWINGS

FIG. 1 shows ultraviolet-blocking cosmetic compositions of Examples 1 to 3 according to the present invention.

FIG. 2 shows ultraviolet-blocking cosmetic compositions of Comparative Examples 1 and 2 according to the present invention.

MODES OF THE INVENTION

Hereinafter, the present invention will be described in detail by way of Examples. The following Examples merely illustrate the present invention and should not limit the scope of the present invention.

Examples 1 to 3: Preparation of Cosmetic Composition

The cosmetic compositions of Examples 1 to 3 were prepared according to the compositions shown in Table 1 below. First, each raw material of Part A was completely dissolved by heating it to 70 to 90° C. while stirring. After the dissolved solution was cooled to 45° C., Part A was added to Part B and mixed while stirring. Separately stirred Part C was slowly added to the previously prepared mixture of Part A and Part B while stirring, and mixed evenly to emulsify. After completion of the emulsification, cooling to 30° C. and defoaming were performed to prepare a cosmetic composition.

TABLE 1

| | Raw material name (parts by weight) | Example 1 | Example 2 | Example 3 |
|---|---|---|---|---|
| Part A | Ethylhexylmethoxycinnamate | 7 | 7 | 7 |
| | Isoamyl P-Methoxycinnamate | 9.5 | 9.5 | 2 |
| | Ethylhexylsalicylate | 4.5 | 4.5 | 4.5 |
| | Diethylaminohydroxy benzoylhexylbenzoate | 2 | 2 | 2 |
| | Ethylhexyltriazone | 2 | 2 | — |
| | Octocrylene | — | 3 | — |
| | Bis-ethylhexyloxyphenol methoxyphenyltriazine | — | — | — |
| | Dicaprylyl Carbonate | 1 | 1 | 8 |
| Part B | PEG-12 Dimethicone/PPG-20 crosspolymer | 5.76 | 6.3 | 4.5 |
| | PEG-15/lauryldimethicone crosspolymer | — | — | — |
| | Lauryl PEG-9 polydimethylsiloxyethyl Dimethicone | 2 | 2 | 2 |
| | caprylyl methicone | 34.24 | 33.7 | 20.5 |
| | isododecane | — | — | — |
| | fragrance | 0.5 | 0.5 | 0.5 |
| Part C | water | 1.8 | 1.6 | 5.1 |
| | Glycerin | 29.3 | 26.5 | 43.5 |
| | Magnesium sulfate | 0.4 | 0.4 | 0.4 |
| | Total | 100 | 100 | 100 |

Comparative Examples 1 and 2: Preparation of Cosmetic Composition

Cosmetic composition were prepared in the same manner as in Examples 1 to 3 according to the compositions shown in Table 2 below.

TABLE 2

| | Raw material name (parts by weight) | Comparative Example 1: | Comparative Example 1: |
|---|---|---|---|
| Part A | Ethylhexylmethoxycinnamate | 7 | 7 |
| | Isoamyl P-Methoxycinnamate | 9.5 | 9.5 |
| | Ethylhexylsalicylate | 4.5 | 4.5 |
| | Diethylaminohydroxy benzoylhexylbenzoate | 2 | 2 |
| | Ethylhexyltriazone | 2 | 2 |
| | Octocrylene | | |
| | Bis-ethylhexyloxyphenol methoxyphenyltriazine | — | — |
| | Dicaprylyl Carbonate | 1 | 1 |
| Part B | PEG-12 dimethicone/PPG-20 crosspolymer | 5.76 | — |
| | PEG-15/lauryldimethicone crosspolymer | — | 5.76 |
| | Lauryl PEG-9 Polydimethylsiloxyethyl Dimethicone | 2 | 2 |
| | caprylyl methicone | 34.24 | 16.96 |
| | Isododecane | — | 17.28 |
| | fragrance | 0.5 | 0.5 |

TABLE 2-continued

|  | Raw material name (parts by weight) | Comparative Example 1: | Comparative Example 1: |
|---|---|---|---|
| Part C | water | 4.1 | 1.8 |
|  | Glycerin | 27 | 29.3 |
|  | Magnesium sulfate | 0.4 | 0.4 |
|  | Total | 100 | 100 |

Experimental Example 1: Measurement of Refractive Index of Aqueous Phase and Oil Phase The refractive indices of the aqueous phase and the oil phase of the cosmetic compositions prepared in Examples 1 to 3 and Comparative Examples 1 and 2 were measured using Abbe refractometer (KRUSS Optronic, Germany) equipment by loading the aqueous phase and oil phase at 25° C. (Table 3). At this time, for the cosmetic composition of Example 1, the refractive indices of the aqueous phase and the oil phase was measured 10 times to confirm the difference in refractive index (Table 4).

TABLE 3

|  | Example 1 | Example 2 | Example 3 | Comparative Example 1 | Comparative Example 2 |
|---|---|---|---|---|---|
| Refractive index of aqueous phase | 1.4600 | 1.4620 | 1.4535 | 1.4495 | 1.4635 |
| Refractive index of oil phase | 1.4590 | 1.4635 | 1.4537 | 1.4590 | 1.4662 |
| Difference in refractive index | 0.001 | 0.0015 | 0.0002 | 0.0095 | 0.0027 |

TABLE 4

|  | $1^{st}$ time | $2^{nd}$ time | $3^{rd}$ time | $4^{th}$ time | $5^{th}$ time | $6^{th}$ time | $7^{th}$ time | $8^{th}$ time | $9^{th}$ time | $10^{th}$ time |
|---|---|---|---|---|---|---|---|---|---|---|
| Refractive index of aqueous phase | 1.4600 | 1.4610 | 1.4605 | 1.4600 | 1.4600 | 1.4590 | 1.4610 | 1.4600 | 1.4605 | 1.4595 |
| Refractive index of oil phase | 1.4590 | 1.4600 | 1.4590 | 1.4585 | 1.4595 | 1.4590 | 1.4585 | 1.4600 | 1.4580 | 1.4590 |
| Difference in refractive index | 0.001 | 0.001 | 0.0015 | 0.0015 | 0.0005 | 0 | 0.0025 | 0 | 0.0025 | 0.0005 |

In order to reduce the difference in refractive index between the oil phase and the aqueous phase, the difference in refractive index may be reduced by first measuring the refractive index of the oil phase and then adjusting the parts by weight of glycerin and water. In addition, as a result of measuring the refractive index of the aqueous phase and the oil phase 10 times for Example 1 (Table 4), it can be confirmed that a measurement error of up to 0.0025 may occur even for the same content.

Experimental Example 2: Measurements of Hardness, UV Protection Factor (SPF) and UVA Protection Factor (UVAPF)

The hardness, UV protection factor (Sun Protection Factor (SPF)) and UVA protection factor (UVA Protection Factor (UVAPF)) of the cosmetic compositions prepared in Examples 1 to 3 and Comparative Examples 1 and 2 were measured. At this time, the hardness of the composition was measured to a depth of 2.5 cm of the sample using an adapter #9 with a Fudoh Rheometer RTC-3005D model from Rheotech Co. at an operating speed of 2 cm/min, and SPF and UVAPF were evaluated for their respective SPF and UVAPF values using a BASF Sunscreen Simulator and are shown in Table 5.

TABLE 5

|  | Example 1 | Example 2 | Example 3 | Comparative Example 1 | Comparative Example 2 |
|---|---|---|---|---|---|
| Hardness | 13 | 17 | 44 | 14 | 6 |
| SPF | 39.4 | 46.5 | 22.9 | 39.4 | 39.4 |
| UVAPF | 6.8 | 7.3 | 6.2 | 6.8 | 6.8 |

As shown in Table 5, it can be seen that in Examples 1 to 3, various SPF and UVAPF values appeared depending on the type and content of the organic ultraviolet-blocking agent.

Experimental Example 3: Confirmation of Formulation Stability

Stability of the compositions were compared after storing the composition for 4 weeks at different temperature conditions (0° C., 25° C. and 50° C.), wherein the stability was confirmed by visually observing whether phase separation appeared or not.
<Evaluation Criteria>
Stable: Phase separation does not appear
Separation: Phase separation appears

TABLE 6

| Storage temperature | Example 1 | Example 2 | Example 3 | Comparative Example 1 | Comparative Example 2 |
| --- | --- | --- | --- | --- | --- |
| 0° C. | Stable | Stable | Stable | Stable | separation |
| 25° C. | Stable | Stable | Stable | Stable | separation |
| 50° C. | Stable | Stable | Stable | Stable | separation |

Results show that the cosmetic compositions of Examples 1 to 3 were stable for 4 weeks at a temperature of 0° C. to 50° C., and that the composition of Comparative Example 2 exhibits phase separation in all temperature conditions of 0° C., 25° C., 50° C.

Experimental Example 4: Evaluation of Transparency and Color Expression

For the cosmetic compositions prepared in Examples 1 to 3 and Comparative Examples 1 and 2, the transparency and intensity of color expression were visually determined and shown in Table 7, FIGS. 1 and 2. At this time, the transparency of the cosmetic composition and the intensity of structural color expression were evaluated by visually judging the composition by a panel of 5 males and 5 females while storing the composition at 25° C. for 120 minutes.

[Evaluation Criteria for Transparency]
◎: very transparent
○: transparent
Δ: semi-transparent
x: opaque

[Evaluation Criteria for Intensity of Color Expression]
◎: very strong
○: strong
Δ: weak
x: none

TABLE 7

| | Example 1 | Example 2 | Example 3 | Comparative Example 1 | Comparative Example 2 |
| --- | --- | --- | --- | --- | --- |
| transparency | ◎ | ○ | ◎ | Δ | —* |
| Intensity of color expression | ◎ | ○ | ◎ | Δ | —* |

(*Transparency cannot be measured due to phase separation of the composition)

As shown in Table 7, the cosmetic compositions of Examples 1 to 3 were transparent, and the cosmetic composition of Comparative Example 1 was semi-transparent. This was due to the refractive index difference between the oil phase and the aqueous phase of Comparative Example 1, 0.0095, which was larger than that of Examples 1 to 3.

The invention claimed is:

1. An ultraviolet-blocking cosmetic composition, comprising:
    an oil phase comprising 10 to 40 parts by weight of an organic ultraviolet-blocking agent, 1 to 10 parts by weight of a silicone-based surfactant comprising a crosspolymer of polyethylene glycol-added dimethicone and polypropylene glycol that are cross-linked, based on 100 parts by weight of the ultraviolet-blocking cosmetic composition, and a non-ionic surfactant; and an aqueous phase,
    wherein the non-ionic surfactant comprises at least one of lauryl PEG-9 polydimethylsiloxyethyl dimethicone, polyglyceryl-6 polyricinoleate, sorbitan sesquioleate, sorbitan isostearate, PEG-9 polydimethylsiloxyethyl dimethicone, PEG-10 dimethicone, or cetyl PEG/PPG-10/1 dimethicone,
    the non-ionic surfactant is comprised in an amount of 0.1 to 10 parts by weight based on 100 parts by weight of the ultraviolet-blocking cosmetic composition, and
    the ultraviolet-blocking cosmetic composition has a difference in refractive index between the oil phase and the aqueous phase of 0.009 or less.

2. The ultraviolet-blocking cosmetic composition according to claim 1, wherein the organic ultraviolet-blocking agent is one or more selected from the group consisting of ethylhexylmethoxycinnamate, isoamyl P-methoxycinnamate, ethylhexylsalicylate, octocrylene, polysilicon-15, homosalate, phenylbenzimidazole sulfonic acid, bis-ethylhexyloxyphenol methoxyphenyltriazine, butylmethoxydibenzoylmethane, diethylaminohydroxybenzoylhexylbenzoate, ethylhexyltriazone, 4-methylbenzylidene camphor, benzophenone-3, diethylhexylbutamidotriazone and disodiumphenyldibenzimidazoltetrasulfonate.

3. The ultraviolet-blocking cosmetic composition according to claim 1, wherein the silicone-based surfactant comprises the crosspolymer of 1 to 30 moles of the polyethylene glycol-added dimethicone and 1 to 30 moles of the polypropylene glycol that are cross-linked.

4. The ultraviolet-blocking cosmetic composition according to claim 1, wherein the aqueous phase further comprises a polyol.

5. The ultraviolet-blocking cosmetic composition according to claim 1, wherein the ultraviolet-blocking cosmetic composition is a water-in-oil (W/O) formulation.

6. The ultraviolet-blocking cosmetic composition according to claim 1, wherein the ultraviolet-blocking cosmetic composition expresses a structural color.

7. A method for preparing an ultraviolet-blocking cosmetic composition, comprising:
    preparing an oil phase by mixing 10 to 40 parts by weight of an organic ultraviolet-blocking agent; 1 to 10 parts by weight of a silicone-based surfactant comprising a crosspolymer of polyethylene glycol-added dimethicone and polypropylene glycol that are cross-linked, based on 100 parts by weight of the ultraviolet-blocking composition; and a non-ionic surfactant,
    wherein the non-ionic surfactant comprises at least one of lauryl PEG-9 polydimethylsiloxyethyl dimethicone, polyglyceryl-6 polyricinoleate, sorbitan sesquioleate, sorbitan isostearate, PEG-9 polydimethylsiloxyethyl dimethicone, PEG-10 dimethicone, or cetyl PEG/PPG-10/1 dimethicone, and the non-ionic surfactant is comprised in an amount of 0.1 to 10 parts by weight based on 100 parts by weight of the ultraviolet-blocking cosmetic composition.

8. The method according to claim 7, which further comprises adding an aqueous phase to the oil phase for emulsification.

9. The method according to claim 7, wherein the silicone-based surfactant comprises the crosspolymer of 1 to 30 moles of the polyethylene glycol-added dimethicone and 1 to 30 moles of the polypropylene glycol that are crosslinked.

10. The method according to claim 7, wherein the aqueous phase further comprises a polyol.

11. The method according to claim 7, wherein the ultraviolet-blocking cosmetic composition is a water-in-oil (W/O) formulation.

12. The method according to claim 7, wherein the ultraviolet-blocking cosmetic composition expresses a structural color.

\* \* \* \* \*